Figure 6:
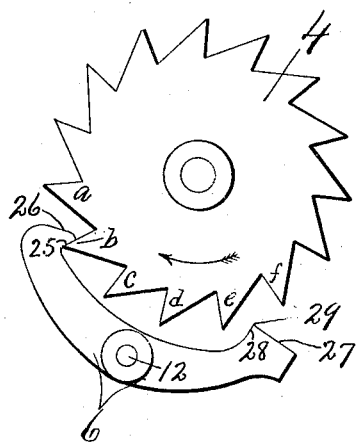

E. G. LATTA.
ESCAPEMENT MECHANISM FOR TYPE WRITING MACHINES.
APPLICATION FILED JULY 6, 1905.
944,794.
Patented Dec. 28, 1909.
2 SHEETS—SHEET 1.
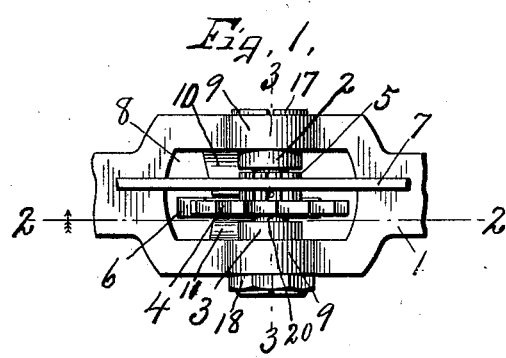
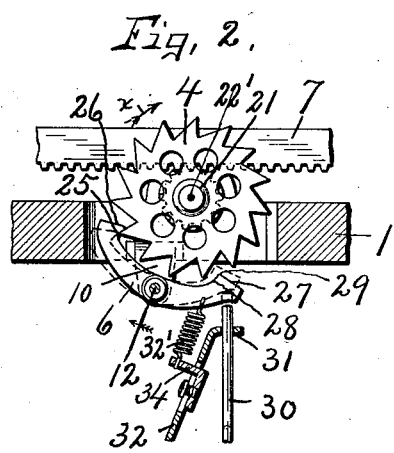
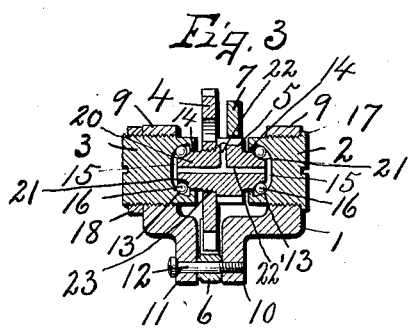
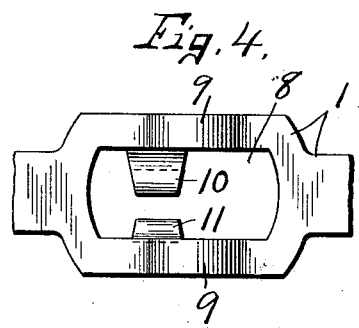
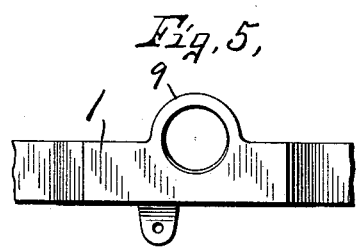
WITNESSES:
B. E. Robinson.
H. E. Cohue
INVENTOR:
Emmit G. Latta
BY:
Howard P. Denison
ATTORNEY.

UNITED STATES PATENT OFFICE.

EMMIT G. LATTA, OF SYRACUSE, NEW YORK.

ESCAPEMENT MECHANISM FOR TYPE-WRITING MACHINES.

944,794.

Specification of Letters Patent. Patented Dec. 28, 1909.

Application filed July 6, 1905. Serial No. 268,508.

*To all whom it may concern:*

Be it known that I, EMMIT G. LATTA, of Syracuse, in the county of Onondaga, in the State of New York, have invented new and useful Improvements in Escapement Mechanism for Type-Writing Machines, of which the following, taken in connection with the accompanying drawings, is a full, clear, and exact description.

This invention relates to improvements in typewriting machines and refers more particularly to the escapement mechanism for controlling the movement of the carriage.

My object is to produce an escapement mechanism with as few parts as practicable, thereby eliminating some of the elements with the result that certain defects, due to the presence of those elements, are done away with and the mechanism is made lighter in weight, more positive and rapid in its action and enables the carriage to be moved backward and forward.

Another object is to mount the star-wheel and its pinion upon specific adjustable bearings which are dust-proof and capable of retaining a limited quantity of oil for the lubrication of the bearings and to otherwise arrange said parts as to insure a free and easy action of the moving elements.

This escapement mechanism is mounted upon a fixed support upon the frame of the machine and I have, therefore, shown only the bare escapement mechanism and a very small portion of the fixed supports therefor together with a small portion of the toothed rack which meshes with the pinion.

In the drawings—Figure 1 is a top plan of my improved escapement mechanism and the adjacent portions of the supporting frame, and toothed rack of the carriage. Figs. 2 and 3 are sectional views taken respectively on lines 2—2, and 3—3, Fig. 1, Fig. 2 showing the star-wheel and escapement-pawl in end view, and Fig. 3 showing the same parts, together with their bearings in section. Figs. 4 and 5 are respectively top plan and side elevation of a portion of the supporting frame upon which the escapement mechanism is mounted. Figs. 6, 7, 8, and 9 represent the escapement wheel, and lever in elevation on an enlarged scale, and show those parts in some of the different positions they assume when in operation.

The mechanism involved in my present invention comprises essentially, a yoke or supporting frame —1—, opposed bearings —2— and —3—, a star-wheel —4— and pinion —5— which are mounted to rotate in said bearings, an escapement-pawl —6— co-acting with the star-wheel —4— and a toothed rack —7— which may be mounted in any suitable manner upon any form of carriage, not necessary to herein illustrate or describe, as the action of the rack and pinion, in controlling the movement of the carriage, is well understood.

The yoke, or support —1— is fixed to and may form a part of the main frame of the machine, and in this instance consists of a metal bar having a portion thereof enlarged and formed with a central vertical opening —8— therethrough for the reception and play of the star-wheel —4— and its pinion —5—, said yoke being also provided with apertured raised ears —9— at opposite sides of the opening —8—, the apertures in said ears being threaded and receive the threaded bushings —2— and —3— presently described.

The portions of the yoke —1— at opposite sides of the opening —8— are also provided with depending ears —10— and —11— having their lower ends spaced apart for receiving between them the central portion of the escapement pawl or lever —6— which is mounted upon a pivotal pin —12— passed through alined apertures in the arms —10— and —11— and central portion of the pawl —6 so that the pawl or lever —6 is substantially balanced upon the pivotal pin —12—.

The bushings —2— and —3— are screwed into their respective apertures from the outer faces of the yoke —1— and are each provided at their inner ends with an annular ball-race —13— and inwardly projecting annular flanges —14— for forming oil cups or pockets —15— in which suitable balls —16— are seated and ride upon or against the annular raceways —13—, the annular flanges —14— projecting a sufficient distance inwardly beyond the ball-bearings —13— to retain a limited quantity of oil in the recesses —15—. The outer end of the bushing —2— which is at the inner or front side of the yoke —1— and star-wheel —4— is enlarged for forming an annular flange —17— abutting against the adjacent face of the yoke when the bushing —2— is screwed up tightly. The other bushing —3— on the rear side of the yoke —1— is adjustable axially and concentric with the axis of the star-wheel —4— and bushing —2— and is held in its adjusted position by a lock-nut —18— engaging the outer threaded end of the bushing —3— and abutting against the adjacent face of the yoke —1—.

It will be observed that the lever —6— is centrally pivoted upon the pin —12— directly below (or in any other suitable circumferential position) the star-wheel —4— and therefore, its opposite ends or arms extend substantially equidistant in opposite directions from its pivot and lie in substantially the same plane as said star-wheel, so that by rocking the lever its opposite ends intersect the path of movement of the points of the teeth of the star-wheel.

The escapement-wheel —4— and pinion —5— are centrally mounted upon a hollow spindle or shaft —20— having cone-ends or bearings 21 entering the open inner ends of the cups 15 and resting on the balls 13 within the annular flanges 14, which latter have a running fit with the shaft or spindle to protect the bearings against the entrance of dust and other foreign matter. The pinion 5 is preferably integral with its supporting shaft to secure perfect concentricity and alinement and is formed with a radial oil-passage 22 communicating with a central lengthwise oil-passage 22′ through the shaft, the radial passage 22 being located at one side of the rack —7— where it is accessible for the introduction of a lubricant when needed, and when so introduced readily finds its way through the passage 22′ into the cups 15. The escapement-wheel 4, which is preferably formed of sheet metal, has a central threaded opening and is screwed tightly upon a left-pitch thread 23 on the shaft 20 and against the adjacent end face of the pinion 5 so that the shaft, pinion and escapement wheel form practically a unitary revoluble structure.

It is, of course, understood that in almost all standard typewriting machines the carriage and toothed rack mounted thereon are drawn in one direction by suitable spring motor, but it is believed to be unnecessary to show any additional parts of the carriage, or its actuating mechanism other than the toothed bar which meshes with the pinion —5—. It is now obvious that the toothed rack meshing with the pinion —5— tends to rotate the star-wheel —4— in one direction indicated by arrow —x—, Fig. 2, and the advance faces or edges of the teeth facing in the direction of such rotation are disposed substantially radial while the other edges are tangential to a circle within the periphery and concentric with the axis of the star-wheel. In the further description of these teeth these edges will be termed respectively, radial and inclined, or beveled. The lever —6— is accordingly constructed to engage with both the radial and inclined edges of the teeth, one of its arms extending in the direction of automatic rotation of the star-wheel, being hook-shaped and formed with a shoulder —25— which is radial with the star-wheel and is also formed with an additional inclined face —26— diverging from the point of the shoulder —25—. The other arm of the lever —6— projecting in the direction opposite to that of the rotation of the wheel —4— is provided with an inclined face —27— and with an additional inclined face —28— forming an angle with the inner end of the inclined face —27— so that when the lever is rocked in one direction this angle enters between two adjacent teeth, such angle being designated by the numeral —29—. The portion of the lever between the shoulder —25— and angle —29— lies in close proximity to the points of the teeth and embraces a number of said teeth, but are so relatively arranged that when the shoulder —25— is in holding engagement with one of the radial edges of one of the teeth the other point —29— lies between radial lines drawn through the points of two adjacent teeth at the opposite side of the pivot —12— from the shoulder —25— and just outside of the line of travel of the points of the teeth.

Figure 7:
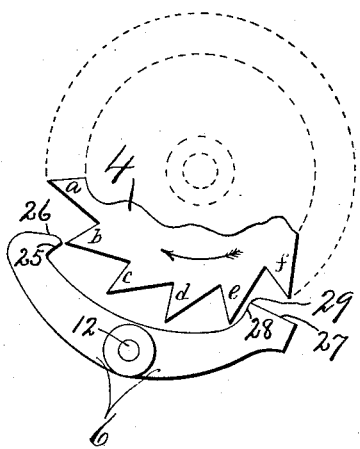

Fig. 6 represents the wheel —4—, and lever —6— in the same position as in Fig. 2, which is the normal or locking position of the lever, this shows that if the end of the lever having the part —29— be raised to the position shown in Fig. 7 the tooth —b— will be free from the detent —25—, and that the wheel actuated by the power driven pinion —5— will instantly move forward until the tooth —f— contacts with the inclined face —27— and forces the lever back to its normal position when the detent will intercept the tooth —c— and lock the wheel against further movement. This action is repeated with each movement of any one of the type-bars, or of the space key, and it should be noted that the wheel moves one whole letter space, or the distance from one tooth to another without the usual intermediate stop; this for the reason that the inclined face —27— does not obstruct the movement of the wheel. The only function of the inclined face —27— is to cause the wheel to positively return the detent —25— to its locking position as the tooth —f— forces the inclined face —27— out of its way. The lever —6— is actuated by a reciprocating rod —30—, and this in turn is thrown upwardly by any kind of a universal bar that will transmit a sudden impulse to the rod at the instant the type-bars strike the platen and then retreat a short distance before the key levers start back toward their normal position, or a universal bar adapted to act on the rod by momentum after the universal bar has passed beyond the control of the key levers; as such universal bars are well known in the art, and form no part of my present invention, their further description is omitted. The rod —30— is supported by a bracket —32— fixed to the frame of the machine, and slides in an aperture —31— therein, the rod as shown in Fig. 2 is made to push upwardly against the lever —6—, but is not pivotally connected thereto. The lever —6— is held in its normal position by a spring —32— which has one end connected to the lever at one side of its pivot and its other end connected to an adjustable anchorage —34— which is rigidly supported by the frame of the machine, the chief function of this spring is to hold the lever in its normal position, but incidentally it acts to assist the wheel in returning the lever to its normal position; this is a useless function for the reason that the wheel automatically, and positively returns the lever as before described. The spring —32— must be of only sufficient power to hold the lever —6— against vibration at the instant between the time when the tooth —f— leaves the inclined face —27— and the engagement of tooth —c— with the detent —25—, this because, if a spring more than slightly stronger than required be used, it would in the case of a heavy, or sluggish carriage, return the lever to its locking position before the carriage driving spring has overcome the inertia of the carriage and started the same, thus preventing the wheel —4— from any movement whatever.

Figure 8:
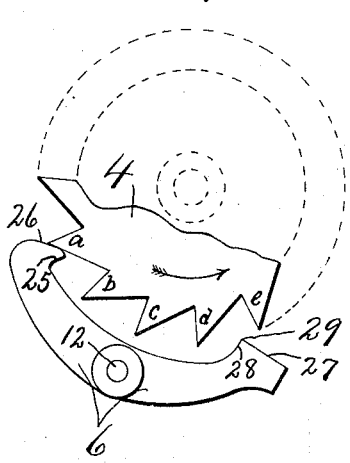
Figure 9:
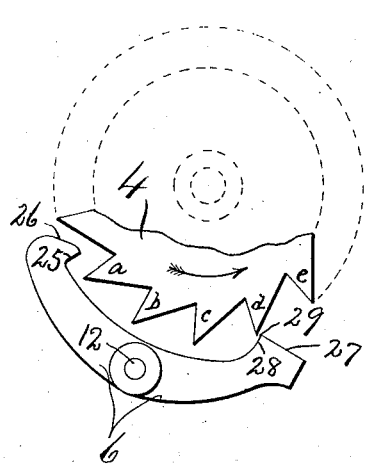

When it is desired to return the carriage by hand, the wheel —4— will be rotated in the opposite direction as indicated in Fig. 8, and Fig. 9, the inclined face of tooth —a— contacting with inclined face —26— of the lever as shown in Fig. 8, and forcing the lever to the position shown in Fig. 7 at the instant the tooth —a— clears the lever, the continued movement of the wheel will then cause the tooth —d— to contact with the inclined face —28— of the lever and force it out of the way as shown in Fig. 9, and at the same time restore the face —26— to a position to be acted on by the next tooth of the wheel. From this it is seen that the lever simply vibrates on its pivot as the wheel is turned backwardly, and that the carriage may be set back any distance from a single space to the full length of its rack bar, and that in all cases the detent will interlock with the last tooth that may have passed it during such backward movement of the carriage, as soon as the carriage is restored to the control of the driving spring. It should be understood that during the backward movement of the wheel the lever vibrates freely without movement of the rod —30—, and the only noise is that made by the lever as it vibrates against the teeth of the wheel, and this is so slight that a separate ratchet and pawl is not required to prevent action of the lever and wheel.

This escapement mechanism comprises but two working parts viz; the wheel —4— and lever —6— both of which are particularly light and easy of action, and therefore respond quickly to the action of their respective operating devices, as the rack and pinion —7— and —5—, and the rod —30—. The wheel —4— and the lever —6— are both made of sheet metal and are therefore comparatively inexpensive to manufacture, and as both are arranged in the same plane, on parallel pivots, there is no end thrust on the pivots, and the friction and wear is greatly reduced as compared with escapements having beveled working faces that necessitate their pivots being arranged on different angles.

The detent —26— is made with its face at substantially right angles to a line drawn between the axes of the lever —6— and wheel —4—, and it meets the back face of the teeth of the wheel on this angle so that there is no tendency for the tooth to slip, and but little power is required to trip the detent; the teeth of the wheel may be made at an angle not radial and the lever pivot arranged to correspond and the same result obtained. The angles of the inclined faces —26—, —27— and —28— may be varied somewhat and the same result be obtained, further use and experiment is required to decide just what form these faces should be to obtain the best results.

I am aware that a two part escapement has been made in which one part of the lever has been arranged with two holding detents in a way to stop the wheel twice for each letter space, also that it is old to arrange the holding dogs in a way to be returned to their normal position by the wheel, but I believe I am the first to produce in a typewriting machine a two part escapement in which a rigid one part vibrating lever operates when tripped to permit the wheel to move a complete letter space, and in which the wheel positively returns the lever to its locking position. I also believe I am first to arrange an escapement consisting of but two working parts, a lever and wheel, in a way to cause the wheel to move forwardly with an intermittent rotary motion when the lever is vibrated, and to permit the lever to vibrate freely as the wheel is turned backwardly with a constant rotary motion.

What I claim is:

1. In a typewriting machine, an escapement mechanism comprising a power driven toothed wheel and a key operated lever pivoted intermediate its ends, which latter are movable alternately into and out of the path of the points of said teeth, one of said ends constituting a detent to normally lock the wheel against forward rotation, and the other end comprising means by which said wheel cams the lever to its normal position on the release of the key operated means.

2. In a typewriting machine, a power driven escapement wheel, in combination with a centrally pivoted lever having a detent at one end normally locking the wheel against forward movement, and an inclined part on its other end on which the escapement wheel acts to restore the detent to locking position each time the lever is vibrated to unlock the wheel, a spring acting to hold the detent in its normal position, and means to rock the lever against the action of said spring.

3. In a typewriting machine, a power driven escapement wheel, in combination with a centrally pivoted lever arranged at one side of the wheel and having a detent at one end normally locking the wheel against forward movement, and an inclined part on its other end on which the escapement wheel acts to restore the detent to locking position each time the lever is vibrated to unlock the wheel, a spring to yieldingly hold the detent in said position, and manually operated means independent of the wheel for vibrating the lever to release the wheel from the detent.

4. In a typewriting machine, a power driven escapement wheel having teeth with their working faces on radial lines, in combination with a centrally pivoted lever arranged in the plane of the wheel having a detent for stopping the wheel at one end and an inclined surface to intercept without stopping the wheel at the other end, the pivot for the lever being arranged on a line extending from the point of contact between the detent and wheel and at right angles to the radial line of the tooth in contact.

5. An escapement mechanism for typewriting machines, comprising a power driven toothed wheel, and a centrally pivoted lever rigidly connecting a locking detent for the wheel at one side of its pivot and a non-holding inclined face at the other side of said pivot, with means for tripping the lever to unlock the detent and at the same time interpose the inclined face between the teeth of the wheel, the wheel acting with its first forward movement to move the inclined face out of its path and restore the detent to its locking position.

6. An escapement mechanism for typewriting machines, comprising a power driven toothed wheel, and a one piece centrally pivoted lever forming a single locking detent for the wheel with means for tripping the lever to unlock the detent, the lever being arranged to permit the wheel to move without stopping a distance equal to the space between two of its teeth each time the lever is tripped, and to be acted on by the wheel during its forward movement to restore the detent to its locking position.

7. In a typewriting machine, an escapement wheel, and a pinion by which it is driven, in combination with a hollow shaft having an oil inlet and a cone at each end supporting the wheel and pinion, with opposed cups having recesses and balls therein to support the cones, the inner faces of the cups being extended to overhang the balls and rest in close relation to the cones whereby the cups retain oil, and exclude dust.

8. In an escapement mechanism for typewriting machines, a power driven toothed wheel, and a vibrating centrally pivoted lever arranged in substantially the same plane as the wheel having a detent on one end acting to lock the wheel against forward rotation, and an intercepting non-locking projection on the other end, said detent and intercepting projection being arranged to permit the wheel to rotate backwardly without stopping.

9. In an escapement mechanism for typewriting machines, a power driven toothed wheel, and a centrally pivoted vibrating lever supporting a detent for locking the wheel against forward rotation at one side of its pivot and an intercepting non-locking projection at the other side of said pivot, with means for tripping the lever, the lever being arranged on one side of the wheel and having its pivot located in close relation to the outer edge of the wheel and in substantially the same plane.

10. In an escapement mechanism for typewriting machines, a power driven toothed wheel, and a centrally pivoted vibrating lever arranged on one side of the wheel and in substantially the same plane having a detent on one end for locking the wheel against forward rotation and an intercepting projection on the other end, with means for tripping the lever, said detent and intercepting projection vibrating alternately toward the wheel from points substantially the same distance from the wheel as the lever pivot and said wheel being adapted to move forward one whole tooth space each time the lever is tripped and to act on the intercepting projection during such movement to restore the detent to locking position.

In testimony whereof I have hereunto set my hand this 28th day of June 1905.

EMMIT G. LATTA.

Witnesses:
HARVEY A. MOYER,
FRANK E. REID.